United States Patent [19]

Gertz

[11] 4,241,576
[45] Dec. 30, 1980

[54] GAS TURBINE ENGINE

[76] Inventor: David C. Gertz, 5810 Yolanda, Apt. 22, Tarzana, Calif. 91356

[21] Appl. No.: 3,480

[22] Filed: Jan. 15, 1979

[51] Int. Cl.³ .............................................. F02C 5/02
[52] U.S. Cl. .................................. 60/39.34; 60/39.78; 60/247
[58] Field of Search ................. 60/39.34, 39.35, 39.76, 60/39.78, 247

[56] References Cited

U.S. PATENT DOCUMENTS

| | | | |
|---|---|---|---|
| 2,612,022 | 9/1952 | Keys | 60/39.35 |
| 3,005,311 | 10/1961 | Ross | 60/39.35 |
| 3,417,564 | 12/1968 | Call | 60/39.34 |

Primary Examiner—Louis J. Casaregola
Attorney, Agent, or Firm—Pastoriza & Kelly

[57] ABSTRACT

The gas turbine engine includes a centrifugal fan having radial blades for receiving inlet air through inner entrance openings to spaces between adjacent blades. The air passes through outer exit openings from the spaces between the blades. Stationary inner and outer circumferential segments define closure members which successively eclipse the inner entrance and outer exit openings of the centrifugal fan blades when the fan rotates to position adjacent blades between the closure members. The closure members and space between the blades thus define closed combustion chambers. Fuel is injected and ignited so that continuous combustion takes place at constant volume, the exhaust gases escaping through the outer exit openings when rotation of the fan positions these openings beyond the outer closure members. This continuous combustion at constant volume provides for increased efficiency in the gas turbine engine over the Brayton cycle constant pressure type turbine engine.

8 Claims, 6 Drawing Figures

GAS TURBINE ENGINE

This invention relates generally to gas turbine engines and more particularly to a gas turbine engine utilizing continuous constant volume combustion as compared to a Brayton cycle type engine which uses constant pressure combustion.

BACKGROUND OF THE INVENTION

Engines which utilize combustion at constant volume rather than constant pressure so that the additional kinetic efficiency of constant volume combustion can be utilized have been known heretofore. Early examples include such engines as the pulsed jet used in the German buzz bombs and the explosion combustion engines of Holzwarth. Other examples include the use of movable valves in back of the compressor and in front of the turbine. Still other examples include the use of stationary combustion chambers symmetrically spaced over the circumference of the engine with a rotary ignition sequence, such as shown in U.S. Pat. 3,877,219 issued Apr. 15, 1975.

In addition, various systems have been proposed to try to improve the combustion efficiency of conventional Brayton cycle gas turbine engines. Increasing the air velocity within the combustion chamber has been tried so that the velocity difference develops more kinetic energy. However, combustion instability and flame-out can occur because of Rayleigh line flow conditions. Thus, a choked flow condition will be reached before an increase in stagnation pressure will occur.

Intermittent choking has been tried by rapid-pulsing the after burner. Only small pressure increases can be achieved, however, before combustion instability or turbine blade damage occur along with non-isentropic flow conditions and shock wave dissipation of energy.

All of the previous proposed engines have not yielded the full kinetic potential of constant volume combustion. These devices use valves, gates, vanes or choked flow conditions which induce intermittent or pulsed flow conditions. The result is reduced air flow volume through the engine producing non-isentropic flow conditions with kinetic energy losses. In addition, combustion instability and incomplete combustion result from the ignition of a stratified charge in an unsteady flow condition.

BRIEF SUMMARY OF THE INVENTION

Bearing the foregoing in mind, the present invention contemplates a highly efficient gas turbine engine utilizing continuous combustion at constant volume wherein there is eliminated the destructive wear found in explosion or pulse combustion type engines.

Essentially, the gas turbine engine of the present invention utilizes a centrifugal fan having radial blades and receiving inlet air through the inner entrance openings to spaces between adjacent blades. This air passes between the blades through outer exit openings at the periphery of the centrifugal fan. Inner and outer circumferential segments stationarily mounted relative to the fan define closure members for successively eclipsing the inner structure and outer exit openings to the spaces between the blades when relative rotation between the fan and segments positions these spaces between the closure members thereby defining closed combustion chambers. The air flow is primarily radial although an axial component is provided by sloping the front and rear edges of the blades making up the centrifugal fan.

Fuel is injected and ignited in the closed combustion chambers so that constant volume continuous combustion takes place. The flow at the inlet is isentropic and experiences no abrupt change in direction or change in speed. Combustion of the air-fuel mixture takes place in the segmented regions defined by the closure members. The exhaust thrust of the exhaust gases is directed tangentially by a series of blades which may be mounted adjacent to the outer closure members.

The centrifugal fan itself is mounted on an axial shaft within a turbine engine cylindrical housing there being provided, in the preferred embodiment, a compressor on the front of the shaft and a turbine on the rear of the shaft. The exhaust gases drive the turbine and thus maintain rotation of the centrifugal fan and air compressor. Because the combustion is essentially continuous, the turbine is not exposed to unsteady flow conditions or pulses.

The continuous combustion process of the invention provides a greatly improved thermo-dynamic efficiency compared to either intermittent flow gas turbines or constant pressure combustion gas turbines.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
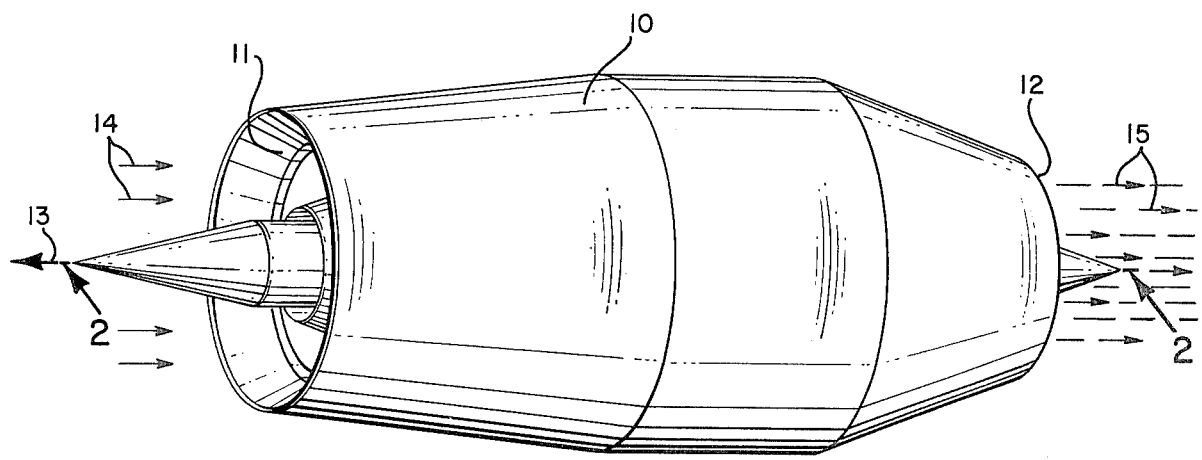
FIG. 1 is a perspective view of the gas turbine engine of this invention.

Referring first to FIG. 1, the gas turbine engine includes an outer cylindrical housing 10 having front and rear air inlet and exhaust gas outlet axially aligned openings 11 and 12. The direction of motion of the engine is indicated by the arrow 13, inlet air being indicated at 14 and exhaust thrust gases being indicated at 15.

Figure 2:
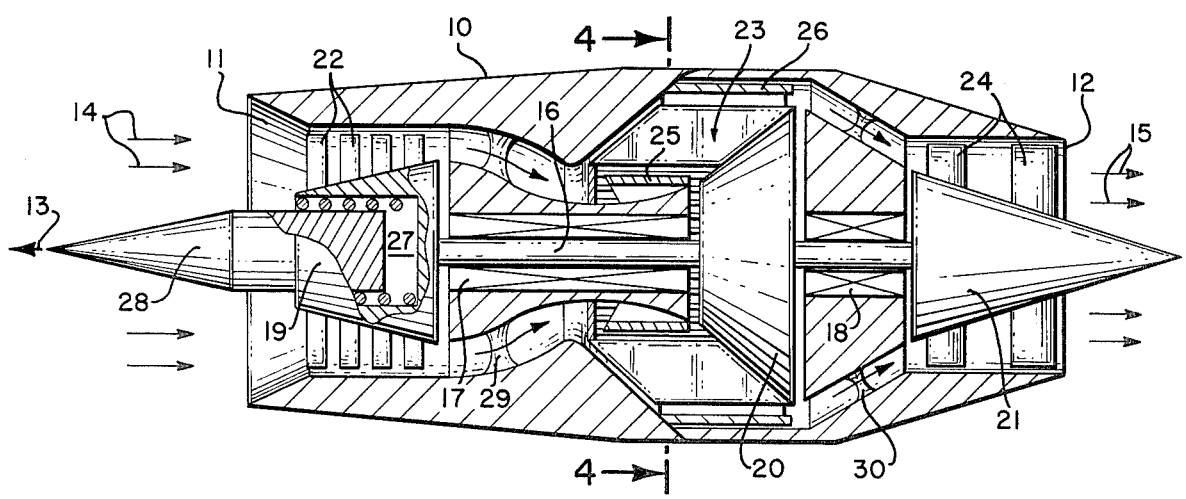
FIG. 2 is an enlarged cross section with certain portions shown in full lines taken in the direction of the arrows 2—2 of FIG. 1.

Referring now to FIG. 2, coaxially disposed in the cylindrical housing 10 is an elongated axial shaft 16 mounted for rotation as by bearings 17 and 18 secured to the housing. Shaft 16 includes a front spindle 19, a central spindle 20 and a rear spindle 21 all secured to and rotatable with the shaft 16. Compressor means in the form of compressor blades 22 are secured to the front spindle 19 as schematically illustrated. A centrifugal fan 23, in turn, is secured to the central spindle 20 for rotation therewith. Finally, a turbine means schematically depicted by turbine blades 24 is secured to the rear spindle 21 for rotation therewith.

The heart of the present invention resides in the centrifugal fan 23 and associated components. These components include stationary segmented inner and outer closure members 25 and 26 juxtaposed to inner and outer entrance and exit portions of the centrifugal fan 23. Details of this construction will be described subsequently.

Still referring to FIG. 2, in the preferred embodiment the front spindle 19 defines an inner bore 27 receiving an axially movable spike diffuser 28 ahead of the air compressor 22. With this arrangement, the longitudinal position of the spike diffuser can be adjusted so that the supersonic air flow at the air inlet opening 11 can be adjusted for maximum efficiency for any given Mach number. The air flow through the engine housing 10 is indicated by the arrows and is smoothly guided by annular air passages defined in the cylindrical housing 10. In this respect, appropriate struts such as indicated at 29 and 30 are provided to support the referred to bearings 17 and 18 and shaft 16 in coaxial relationship to the housing 10.

Figure 3:
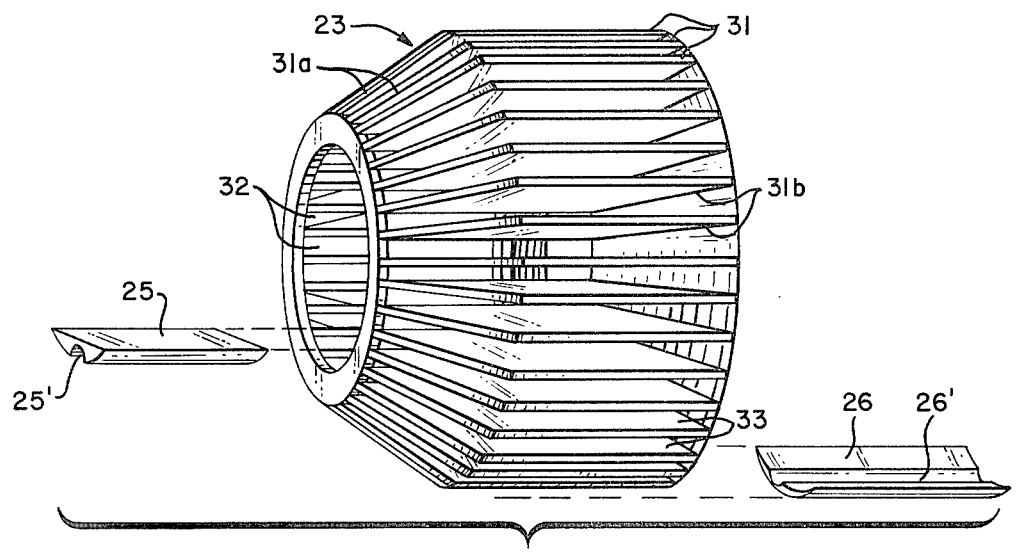
FIG. 3 is an exploded perspective view schematic in form illustrating certain basic components of the engine.

Referring now to FIG. 3, further details of the centrifugal fan 23 briefly mentioned with respect to FIG. 2 will now be set forth. As shown in FIG. 3, the centrifugal fan 23 is made up of radial blades 31 which preferably have their front and rear edges 31a and 31b sloping radially outwardly and rearwardly from their inner to outer ends. With this arrangement, gas flow between the blades has both a radial and axial component.

Inner entrance openings to the spaces between the blades 31 are indicated at 32 in FIG. 3 while outer exit openings from the spaces between the blades are indicated at 33.

One each of the inner and outer segmented closure members is shown in FIG. 3 exploded away from the centrifugal fan 23. Each of these members defines a semi-cylindrical cavity such as indicated at 25' for the inner closure member 25 and 26' for the outer closure member 26. The closure members are positioned juxtaposed to the inner and outer entrance and exit portions of the blades as illustrated in FIG. 2 such that the inner entrance and outer exit openings 32 and 33 to the spaces between adjacent blades are successively simultaneously closed off by the members 25 and 26 as the fan rotates. The closed off spaces define constant volume combustion chambers.

Figure 4:
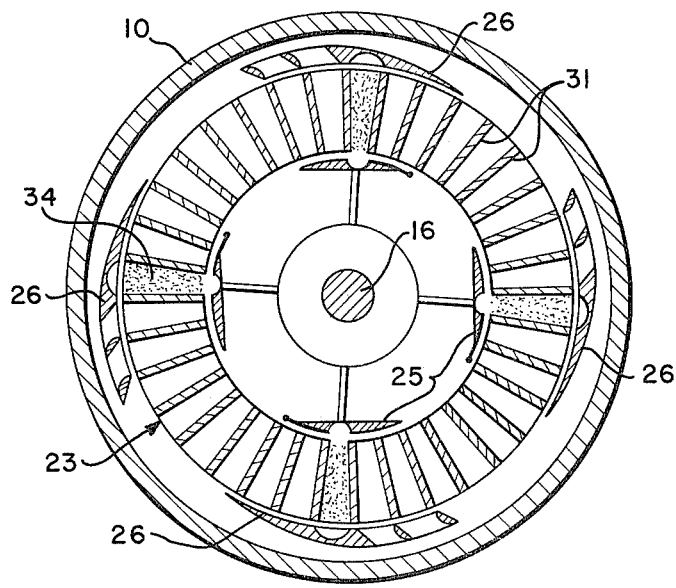
FIG. 4 is a cross section taken in the direction of the arrows 4—4 of FIG. 2.

The foregoing can better be understood by now referring to FIG. 4 wherein one of the closed off combustion chambers is indicated by the numeral 34, the semi-cylindrical cavities of the inner and outer closure members 25 and 26 being juxtaposed the opposite entrance and exit openings between the blades. Referring once again to FIG. 2, it will be understood that the outer closure members, a total of four of which are provided as an example, are secured in stationary positions by the housing 10 while the inner closure members are held in stationary position by the inner portion of the housing supporting the bearings 17. The blades of the centrifugal fan 23 thus rotate between the inner and outer closure members so that sequential spaces between the blades have their entrance and exit portions eclipsed by the closure members.

Figure 5:
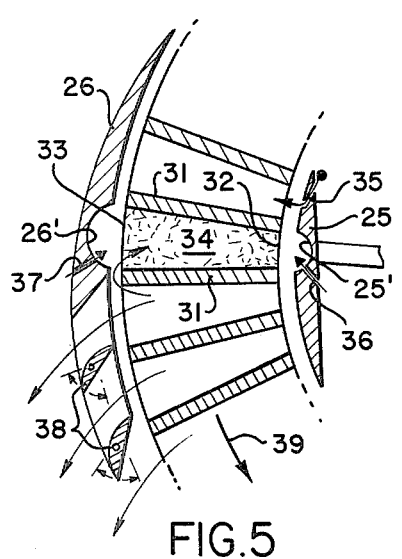
FIG. 5 is an enlarged fragmentary view of a portion of the engine illustrated in FIG. 4.

Referring to the enlarged fragmentary view of FIG. 5, there is schematically depicted a fuel injection means as by the arrow 35 on the inner closure member 25 for injecting fuel into the space between adjacent blades as they become initially eclipsed by the closure members 25 and 26. When this closed space reaches the position indicated by the combustion chamber 34 in FIG. 5 wherein the semi-cylindrical surfaces 25' and 26' are juxtposed the entrance and exit openings 32 and 33 of the combustion space, appropriate ignition is effected by an ignition means designated 36 and 37. This ignition means may be an electrical spark.

As can best be seen in FIG. 5, there are provided movable guide vanes 38 following the outer closure members. These guide vanes guide the escaping exhaust gases from the outer exit openings as the centrifugal fan continues to rotate so that the gases have both axial and circumferential velocity components as they pass through the turbine blades 24 of FIG. 2. The direction of rotation of the centrifugal fan is counterclockwise as viewed in FIGS. 4 and 5 and as indicated by the arrow 39 in FIG. 5.

The semi-cylindrical cavities 25' and 26' in the inner and outer members 25 and 26 will momentarily expose the fuel-air mixture in a closed combustion chamber such as 34 to the pressure and heat of the already combusted fuel-air mixture in the immediately preceding combustion chambers. This exposure provides a feedback compression ratio in the closed combustion chamber and also effects ignition so that once the engine is running, no further ignition means is required.

By adjusting the position of the movable guide vanes to change the guiding opening area, the foregoing compression ratio can be changed.

Since the centrifugal fan rotates continuously, there is continuously being defined closed combustion chambers so that effectively continuous combustion is taking place. In the particular example illustrated in the drawings, there are provided essentially four inner closure members and four cooperating outer closure members as briefly mentioned heretofore so that combustion is taking place simultaneously in four closed constant volume spaces between adjacent blades.

Thus, it will be understood that air is drawn from the inside to the outside of the centrifugal fan by centrifugal force. Exhaust gases from previously combusted fuel-air mixtures pass through the guide vanes such as indicated at 38 in FIG. 5 so that the gas is cleared and replaced by fresh air. As the space between the blades initially becomes eclipsed by the closure members, fuel is sprayed into the closed area and this area then sealed off as rotation of the fan continues. At the position approximately of the combustion chamber 34 described in FIG. 5, the ignition takes place so that combustion occurs at constant volume. The pressure during this combustion increases approximately five times so that as the closed combustion chamber passes from the outer closure member 26, the exhaust gases escape at high velocity. The blades 31 of the centrifugal fan thus cycle between heating and cooling, and therefore have an operating temperature similar to that of the turbine blades.

The exhaust thrust from the centrifugal fan is initially tangential and then develops a circular direction with the highest velocity on the outer circumference and the slowest velocity on the inside circumference. These laminar velocity differentials develop a mean velocity as the flow approaches the turbine blades 24 shown in FIG. 2. This flow has an axial velocity as well as an angular velocity upon entering the turbine so that the turbine is not exposed to unsteady flow conditions or pulses as mentioned heretofore.

Figure 6:
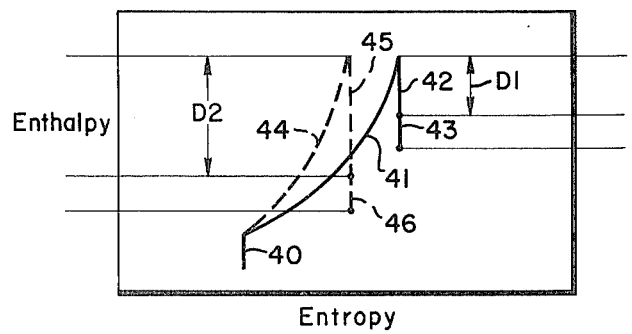
FIG. 6 is an enthalpy-entropy diagram of the gas turbine combustion cycle showing the operating characteristics of a Brayton cycle without constant volume combustion compared to the constant volume combustion engine of the present invention.

The increased thermodynamic efficiency as a consequence of continuous constant volume combustion provided by the gas turbine engine of this invention can be appreciated by now referring to the enthalpy-entropy diagram of FIG. 6. In FIG. 6, the solid line diagram illustrates a Brayton cycle for a typical turbo jet aircraft flying at 36,000 feet with a 5 to 1 compression ratio. Compression takes place at position 40 and combustion takes place at position 41 which is shown at constant pressure. The isentropic expansion part of the cycle is shown at 42 and represents the power delivered. Position 43 indicates the power to drive the compressor.

The modified cycle as a consequence of continuous constant volume combustion provided by the engine of the present invention is indicated by the dashed line wherein again compression takes place at position 40 and combustion takes place at position 44 which is shown at constant volume. The isentropic expansion part of the cycle representing delivered power is indicated at 45 and the portion 46 represents the power to drive the compressor. In FIG. 6, the expansion portion providing delivered power and indicated at 42 for the prior art engine under consideration is designated D1 while the expansion power delivered portion for the engine of the present invention indicated at 45 is designated D2. It can be seen that D2 is nearly twice D1 so that approximately twice the power is delivered.

From all of the foregoing, it will thus be evident that the constant volume continuous combustion gas turbine engine of this invention provides increased efficiency over a Brayton cycle constant pressure type turbine engine.

I claim:

1. A gas turbine engine including a centrifugal fan having radial blades and receiving inlet air through the inner entrance openings to spaces between adjacent blades, said air passing through outer exit openings from said spaces; inner and outer circumferential segments defining closure members for successively eclipsing said inner entrance and outer exit openings when relative rotation between said fan and segments positions said spaces between said closure members to thereby define closed combustion chambers; and means for injecting and igniting fuel into said closed combustion chambers so that constant volume continuous combustion takes place to provide increased efficiency over a Brayton cycle constant pressure type turbine engine.

2. A gas turbine engine according to claim 1, including an axial shaft rotatably mounting said centrifugal fan; an air compressor on the front portion of said shaft; and a turbine on the rear portion of said shaft receiving and being driven by exhaust gases from said constant volume combustion chambers.

3. A gas turbine engine according to claim 2, including an outer cylindrical housing having front and rear openings and surrounding said centrifugal fan, compressor and turbine, said housing mounting bearings for said axial shaft and supporting said inner and outer closure members in stationary positions.

4. A gas turbine engine including, in combination:

(a) an outer cylindrical housing having front and rear air inlet and exhaust gas outlet axially aligned openings;

(b) an elongated axial shaft mounted in said body for rotation, said shaft carrying a front, central and rear spindle;

(c) compressor means mounted on said front spindle for rotation therewith;

(d) a centrifugal fan having radial blades mounted on said central spindle for rotation therewith;

(e) a turbine means mounted on said rear spindle for rotation therewith;

(f) stationary segmented inner and outer closure members defining semi-cylindrical cavities successively juxtaposed to inner and outer entrance and exit portions of said blades such that the inner entrance and outer exit openings to spaces between adjacent blades are successively simultaneously closed off by said members as said fan rotates to define constant volume combustion chambers;

(g) fuel injection means positioned to inject fuel in the spaces between adjacent blades just prior to being closed off by said inner and outer closure members; and (h) ignition means for igniting the fuel-air mixture in said constant volume combustion chamber so that combustion takes place continuously under constant volume, exhaust gases passing from the outer exit openings of the spaces between adjacent blades after passing the outer closure members to drive said turbine and maintain rotation of said spindle shaft, said compressor passing air into the inner portion of said centrifugal fan to be received in said inner entrance openings.

5. A gas turbine engine according to claim 4, in which said semi-cylindrical cavities momentarily expose the fuel-air mixture in a closed combustion chamber to the pressure and heat of the already combusted fuel-air mixture in the immediately preceding combustion chamber to provide a feedback compression ratio and also to effect ignition so that once said engine is running, no further ignition means is required.

6. A gas turbine engine according to claim 5, including guide vanes following the outer closure members for guiding the escaping exhaust gases from said outer exit openings to said turbine means, said guide vanes being movable to allow adjustment of the guiding opening area for the exiting exhaust gases to thereby enable changing of said feedback compression ratio.

7. A gas turbine engine according to claim 4, in which said front spindle defines an axially movable spike diffuser ahead of said compressor means so that the supersonic air flow at said air inlet opening can be adjusted for maximum efficiency for any given Mach number.

8. A gas turbine engine according to claim 4, in which the front and rear edges of said blades for said centrifugal fan slope radially outwardly and rearwardly from their inner to outer ends so that gas flow between said blades has an axial component.

* * * * *